(12) United States Patent
Forrest et al.

(10) Patent No.: US 10,215,213 B2
(45) Date of Patent: Feb. 26, 2019

(54) QUICK-DISCONNECT FASTENING SYSTEM

(71) Applicant: LIBERTY HARDWARE MFG. CORP., Winston-Salem, NC (US)

(72) Inventors: Earl David Forrest, Asheboro, NC (US); Sagar Kishor Giri, Maharashtra (IN); Jegatheesan Mohandoss, Tamil Nadu (IN)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 203 days.

(21) Appl. No.: 15/296,748

(22) Filed: Oct. 18, 2016

(65) Prior Publication Data

US 2018/0094668 A1 Apr. 5, 2018

(30) Foreign Application Priority Data

Oct. 4, 2016 (IN) .............................. 201611033994

(51) Int. Cl.
| | |
|---|---|
| *F16B 21/18* | (2006.01) |
| *F16B 21/07* | (2006.01) |
| *B25B 15/00* | (2006.01) |
| *A47G 29/10* | (2006.01) |
| *F16B 45/00* | (2006.01) |
| *A47G 25/06* | (2006.01) |

(52) U.S. Cl.
CPC .......... *F16B 21/073* (2013.01); *B25B 15/005* (2013.01); *F16B 21/186* (2013.01); *A47G 25/0607* (2013.01); *A47G 29/10* (2013.01); *F16B 45/00* (2013.01)

(58) Field of Classification Search
CPC ...... F16B 21/073; F16B 21/18; F16B 21/186; F16B 35/06; F16B 37/02; F16B 37/08; F16B 43/00; F16B 45/00
USPC ................................. 411/400, 401, 517, 533
See application file for complete search history.

(56) References Cited

U.S. PATENT DOCUMENTS

| | | | |
|---|---|---|---|
| 1,512,653 A | 10/1924 | Tinnerman | |
| 2,137,929 A | 11/1938 | Tinnerman | |
| 2,373,312 A | 4/1945 | Hughes | |
| 2,492,115 A * | 12/1949 | Crowther | F16B 21/16 174/66 |
| 2,552,066 A | 5/1951 | Sorensen | |
| 2,929,474 A * | 3/1960 | Boardman | F16B 41/002 403/21 |
| 2,979,794 A | 4/1961 | De Bartolo | |
| 3,141,211 A | 7/1964 | Blake | |

(Continued)

FOREIGN PATENT DOCUMENTS

EP 1182369 A2 2/2002

*Primary Examiner* — Roberta S Delisle
(74) *Attorney, Agent, or Firm* — Brooks Kushman P.C.

(57) ABSTRACT

A fastener assembly is provided having a cylindrical shank with a plurality of annular grooves formed along a length of the shank. A plurality of elongated ribs extends perpendicular to the grooves along the length. A fastener disc is provided with a central opening with a diameter less than a cylindrical shank diameter wherein an inner edge of the central opening includes a contact surface. The fastener disc is retained on the fastener portion in a locked position when the contact surface engages one of the plurality of grooves with a friction fit. The fastener disc is rotated to a release position so that the elongated rib contacts the inner edge thereby releasing the contact surface from the grooves.

15 Claims, 10 Drawing Sheets

(56) References Cited

U.S. PATENT DOCUMENTS

| | | | |
|---|---|---|---|
| 3,855,895 A | | 12/1974 | Francis, Jr. |
| 4,204,566 A | * | 5/1980 | Kirrish .................... F16B 39/26 |
| | | | 411/324 |
| 4,844,677 A | * | 7/1989 | Schwartzman ......... F16B 39/24 |
| | | | 411/512 |
| 4,866,816 A | | 9/1989 | Caveny |
| 5,868,537 A | | 2/1999 | Latal et al. |
| D445,980 S | | 7/2001 | Tjugum |
| 6,368,319 B1 | * | 4/2002 | Schaefer ............ A61B 17/8635 |
| | | | 411/412 |
| 6,568,893 B2 | | 5/2003 | Le Vey et al. |
| 6,676,350 B1 | * | 1/2004 | McSherry ............... F16B 39/24 |
| | | | 411/135 |
| D580,616 S | | 11/2008 | Bizzell et al. |
| 7,613,012 B2 | * | 11/2009 | Hung .................... F16B 21/186 |
| | | | 361/803 |
| 8,177,455 B2 | | 5/2012 | Zirin et al. |
| 8,506,224 B2 | * | 8/2013 | Cosenza ............... F16B 5/0208 |
| | | | 411/353 |
| 8,926,244 B2 | | 1/2015 | Sasaki |
| 9,140,285 B2 | | 9/2015 | Burton |
| 2010/0129144 A1 | * | 5/2010 | Osborne ............... A47J 43/288 |
| | | | 403/291 |
| 2014/0115861 A1 | | 5/2014 | Mellis |
| 2015/0167728 A1 | * | 6/2015 | Bizzini ............... F16B 37/0842 |
| | | | 411/517 |

* cited by examiner

QUICK-DISCONNECT FASTENING SYSTEM

CROSS-REFERENCE TO RELATED APPLICATIONS

This application claims the priority of Indian application No. IN 201611033994 filed Oct. 4, 2016, the disclosure of which is hereby incorporated in its entirety by reference herein.

TECHNICAL FIELD

The present application relates to a fastening system that provides for quick disconnection.

BACKGROUND

Prior art fastening systems for hook rails typically have a rail and at least one hook attached to the rail by way of a threaded hole in the back of the hook and a corresponding threaded fastener. Other fasteners such as quarter-turn fasteners and cable ties offer a means of attaching one or more components to another and to provide retention and locking.

SUMMARY

According to one embodiment, a fastener assembly is provided having a cylindrical shank with a plurality of annular grooves formed along a length of the shank. A plurality of elongated ribs extends perpendicular to the grooves along the length. A fastener disc is provided with a central opening with a diameter less than a cylindrical shank diameter wherein an inner edge of the central opening includes a contact surface. The fastener disc is retained on the fastener portion in a locked position when the contact surface engages one of the plurality of grooves with a friction fit. The fastener disc is rotated to a release position so that the elongated rib contacts the inner edge thereby releasing the contact surface from the grooves.

In another embodiment, the elongated ribs have drafted sides that act as a cam surface when the disc is rotated.

In another embodiment, in the release position, the rib causes the contact surface to deflect so that the diameter of the central opening is greater than the cylindrical shank.

In another embodiment, a plurality of deflectable tabs is connected to the fastener disc. The contact surface comprises an inner edge of each deflectable tab is defined along the central opening of the fastener disc.

In another embodiment, the fastening disc includes a plurality of slots that project radially outward from the central opening. One of the deflectable tabs is formed between each of the slots.

In another embodiment, the plurality of tabs comprises four deflectable tabs. The fastener disc is turned generally an eighth-turn to the release position.

In another embodiment, a radial opening extends from the central opening and is defined between each of the tabs. The elongated rib is aligned with the radial opening when the disc is in the locked position.

In another embodiment, the fastener assembly includes a disassembly tool, to engage and rotate the disc to the release position.

In another embodiment, the disassembly tool comprises a plurality of teeth, wherein each tooth is shaped to engage a slot between each deflectable tab.

In another embodiment, the disassembly tool grips a peripheral edge of the disc.

In another embodiment, the grooves are defined between the elongated ribs.

According to another embodiment, a quick-disconnect fastener assembly is provided with a mating part with a hardware portion and a fastener portion. The fastener portion is provided with a cylindrical shank with a plurality of annular grooves formed along a length of the shank. A plurality of elongated plateaus extends the length of the cylinder perpendicular to the grooves, the elongated plateaus having drafted sides. A fastener disc is provided with a central opening with a diameter less than a cylindrical shank diameter. A plurality of slots project radially outward from the central opening. A chamfered opening is provided between each of the slots and the central opening. A chamfer angle of the chamfered opening is generally equal to a draft angle of the drafted sides along the plateaus. A plurality of deflectable tabs is provided on the disc, each tab defined between two adjacent slots. An inner edge of each deflectable tab is defined along the central opening. The fastener disc is retained on the mating part when the cylindrical shank is inserted through the central opening so that each of the elongated plateaus is aligned with one of the chamfered openings and the plurality of deflectable tabs is engaged with one of the plurality of grooves with a snap-fit. The fastener disc is disconnected from the mating part by rotation of the disc whereby the elongated plateaus contact the inner edge of the deflectable tabs and release the deflectable tabs from the grooves so that the cylindrical shank is removable from the central opening.

In another embodiment, the hardware portion of the mating part comprises a hook.

In another embodiment, the hardware portion of the mating part comprises a fastener head.

In another embodiment, the mating part comprises a frangible connection for disconnecting the hardware portion.

According to another embodiment, a fastener method is provided. A fastening portion is provided with a cylindrical shank with a plurality of annular grooves formed along a length of the shank and a plurality of longitudinal ribs oriented along the shank that extend perpendicular to and intersect the grooves. A fastener disc is with a plurality of deflectable tabs where an inner edge of each deflectable tab defines a central opening of the fastener disc with a diameter less than a cylindrical shank diameter. The fastening portion is inserted into the central opening disc. The fastening portion is pushed to a locked position where of deflectable tabs is engaged with one of the plurality of grooves with an interference fit.

In another embodiment, the method includes rotating the fastener disc to a release position so that the elongated rib contacts the inner edge of the deflectable tabs to disengage the tabs from the grooves.

In another embodiment, in the release position, the rib causes the contact surface to deflect so that the diameter of the central opening is greater than the cylindrical shank.

In another embodiment, the method includes rotating the fastener disc generally an eighth-turn to the release position.

In another embodiment, a radial opening extending from the central opening and defined between each of the tabs, the method further comprising aligning the elongated rib is with the radial opening when the disc is in the locked position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Quarter-turn fasteners and cable ties, more commonly known as "zip-ties," offer a quick and easy means of attaching one or more components to another. In general, these objects utilize a flexible component to engage threads or a set of repeating features at right angles for optimal retention. However, these type of fasteners are difficult to disconnect or are not reusable after disconnection.

Figure 1:
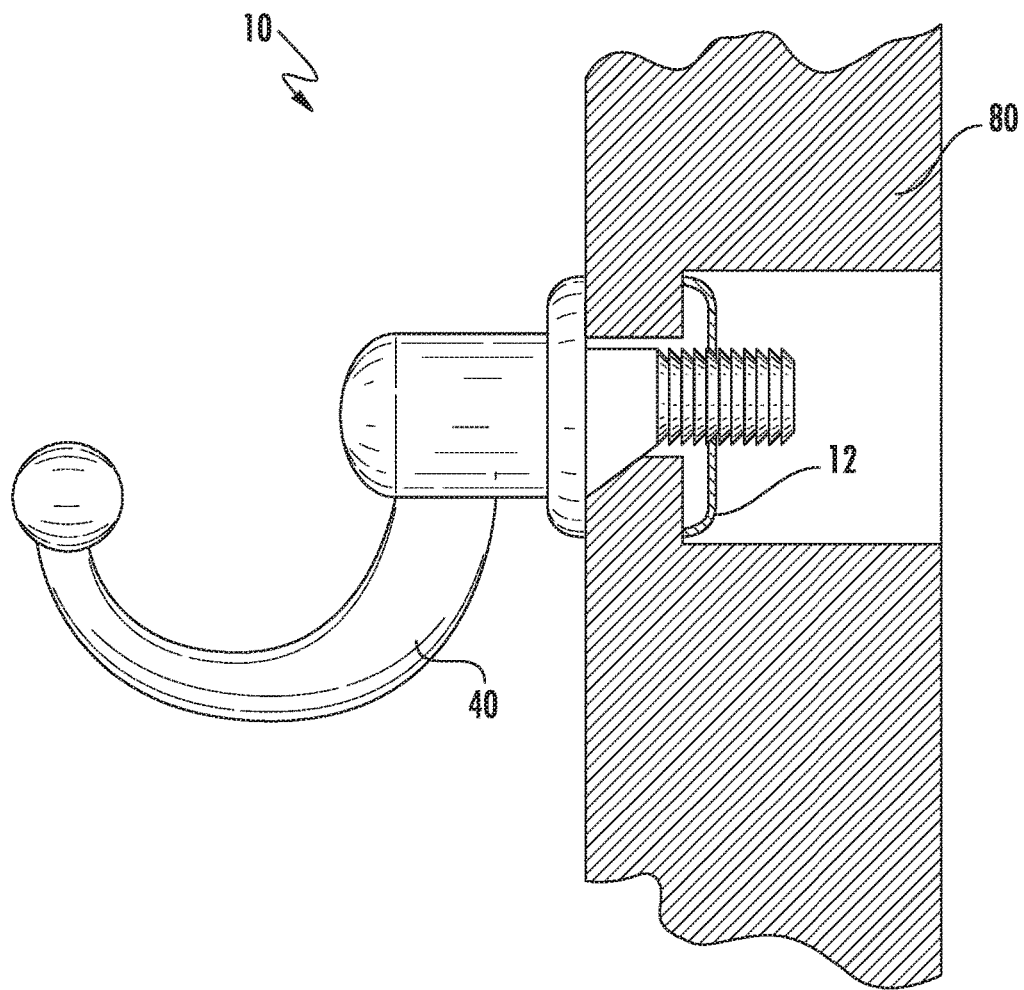
FIG. 1 illustrates a section view of a quick-disconnect fastening assembly, according to one embodiment.

FIG. 1 illustrates a quick-disconnect fastening assembly 10. The quick-disconnect fastening assembly 10 utilizes a spring disc 12 to fasten a mating part 40 to a panel 80, just as in a hook-and-rail assembly. The quick-disconnect fastening assembly 10 provides an improved, simplified and low cost fastener assembly for attaching one object to another. The quick-disconnect fastening assembly 10 is self-locking and provides retention, yet is quickly and easily removable. The quick-disconnect fastening assembly 10 utilizes simplified geometry over the prior art while also including mating geometry that allows quick disassembly when needed. Assembly is accomplished without the need for rotation which can cause repetitive motion injuries in a factory setting where high volumes place a significant burden on assembly workers. Removal of the fastener is accomplished by rotating the device through an angle of 45-degrees, or an eighth-turn and then pulling at least one of the components in the opposite direction that was needed for assembly. Historically, quick release fasteners required a full 90-degrees, or a quarter turn for both assembly and removal and were thus called quarter-turn fasteners.

Figure 2:
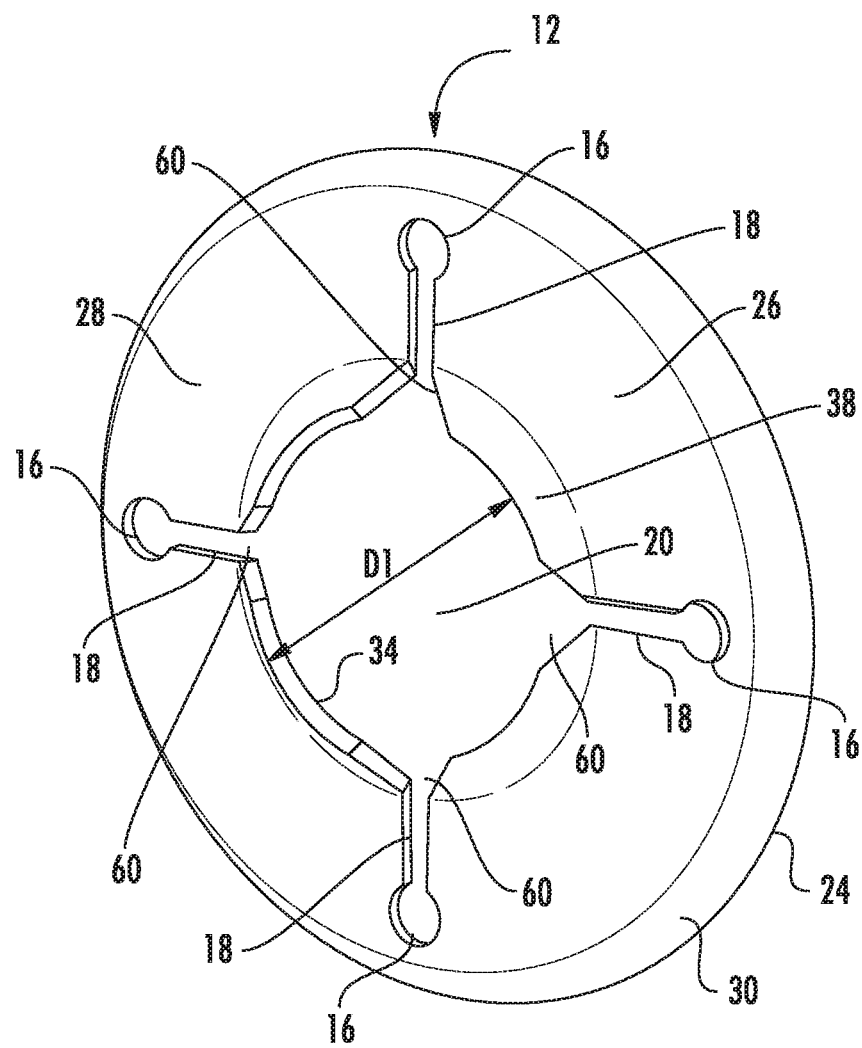
FIG. 2 illustrates a fastener disc of the quick-disconnect fastening assembly of FIG. 1, according to one embodiment.

FIG. 2 illustrates the spring disc 12 of the quick-disconnect fastening assembly 10. The spring disc 12 contains four through-holes 16 which are connected to four through slots 18. The slots 18 extend radially from a central opening 20 to the through-holes 16. As shown in FIG. 1, a circular peripheral edge 24 is oriented concentrically around the central opening 20, as shown in FIG. 1. However, the peripheral edge 24 may be any suitable shape. The peripheral edge 24 also forms the base of the spring disc 12 that may abut a mounting surface.

The spring disc 12 may be formed of metal and produced using a high speed stamping process. This process also allows the spring disc 12 to be produced in high volumes at relatively low cost. The disc 12 may be made from a grade of spring steel. Alternatively, the disc 12 may be formed of suitable injection molded polymeric material using a multi-cavity mold.

Four flexible tabs 26 are defined between the slots 18. The flexible tabs 26 define a forward surface 28 of the disc 12. The forward surface 28 faces the user as the disc 12 is pushed onto the mating part 40. The forward surface 28 is offset and generally parallel to a mounting surface. The forward surface 28 is connected to the peripheral base 24 by a peripheral surface 30. The peripheral surface 30 may extend generally perpendicular to the forward surface 28. Alternatively, the peripheral surface 30 may be angled outwardly from the forward surface 28 for ease of tooling and reduced stress within the part during assembly and use. The point where these two surfaces 28, 30 meet has a rounded edge, which is also for ease of tooling and reduced stress.

An inner edge 34 of the flexible tabs 26 is allowed to deflect by a distance which is equal to or greater than the wall thickness of the spring disc 12 without exceeding the working limits of the material used. The through-holes 16 help to minimize stresses created as the flexible tabs 26 move toward or away from the peripheral base 24. The through-holes 16 are located radially close to the peripheral surface 30 to allow each of the four flexible tabs 26 to move independently of each other as needed thereby providing the overall tolerance sensitivity of the system. The inner edges 34 of each of the flexible tabs 26 define the diameter D1 of the central opening 20. The flexible tabs 26 allow variations in tolerance by having the diameter D1 equal to or less than a minor diameter of the mating part 40 and thus generating a spring tension between disc 12 and the mating part 40 at full engagement. The flexible tabs 26 have a ramped surface 38 that extends upward from the forward surface 28.

Figure 3:
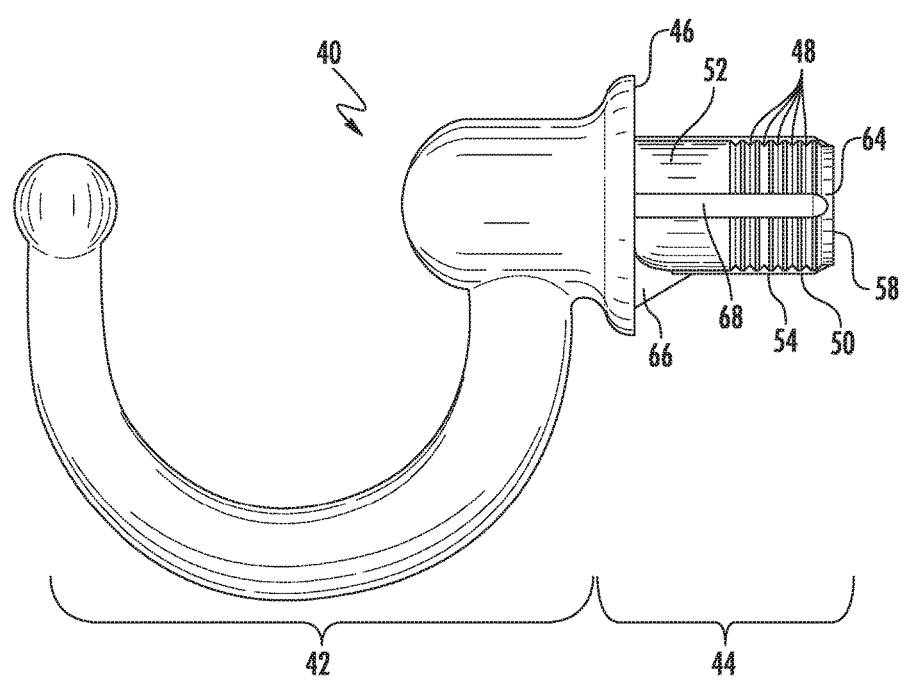
FIG. 3 illustrates a mating part of the quick-disconnect fastening assembly of FIG. 1, according to one embodiment.

The fastener disc 12 mates or interfaces with the mating part 40, such as a hook illustrated in FIG. 3. The mating part 40 includes a hardware portion 42. As illustrated in FIG. 3, the hardware portion is defined as a hook which is designed for holding keys or may be sized for holding other items. However, the hardware portion 42 may be provided in any suitable configuration such as a peg, knob or other hardware shape.

The mating part 40 also includes a fastener portion 44. The fastener portion 44 of the mating part 40 is typically inserted through a board or panel 80 that forms the rail of the hook-and-rail assembly. The fastener disc 12 is then applied to the fastener portion 44 from the back side of the panel for a quick and easy means of securing the mating part 40 or other component without the need for threaded holes or threaded fasteners.

Figure 4:
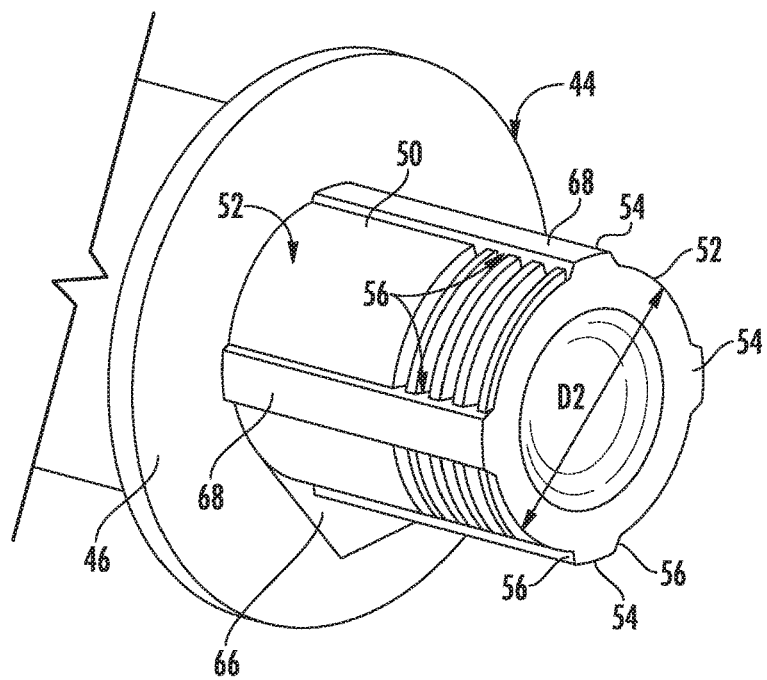
FIG. 4 is a detailed view of a portion of the mating component of FIG. 3, according to one embodiment.

With reference to FIGS. 2-4, the fastener portion 44 includes a generally cylindrical shaped shank 50 that projects away from the base 46. The fastener portion 44 includes a plurality of grooves 48 formed along a cylindrical surface 52 of the shank 50. The grooves 48 are formed adjacent a distal end 58 of the shank 50. The grooves 48 may be positioned at various distances from the base 46 to allow for a variety of different panel thicknesses and to allow for normal machining process tolerances of the panel.

The grooves 48 may be v-shaped having symmetrically angled walls that intersect to form the grooves 48. Alternatively, may be asymmetrical, with each groove having a steeper sloped wall closest to the distal end 58 and a moderate sloped wall inboard closest to the base 46. The asymmetrical groove may be formed similar to a ratchet tooth. The grooved cylindrical shank 50 may be die-cast or molded with the mating part 40 thus eliminating the drilling and/or tapping operations required with typical mating components.

Figure 5:
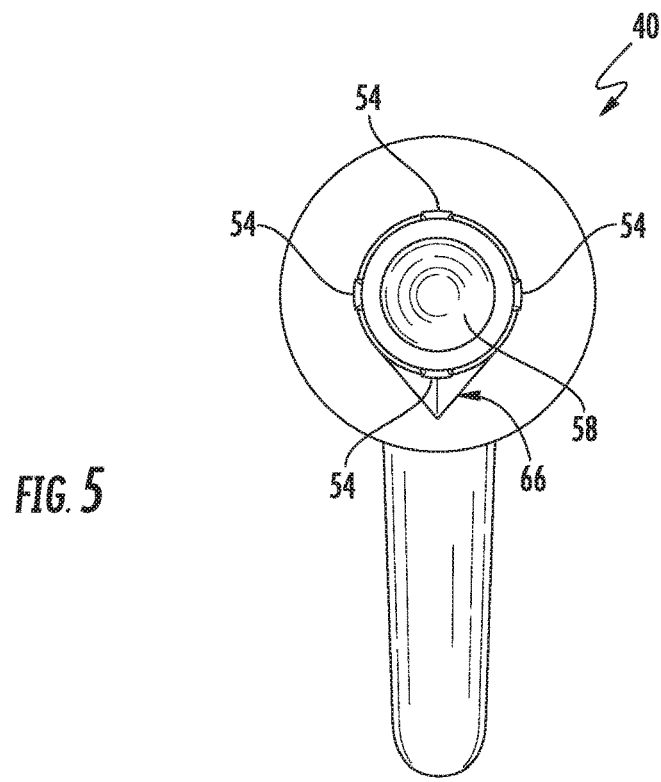
FIG. 5 is a rear view of the mating part of FIG. 3, according to one embodiment.

Additionally, the cylindrical shank 50 has a plurality of longitudinal ribs 54 that extend the length of the cylindrical shank 50 and are perpendicular to the grooves 48. As shown in FIG. 4-5, the fastener portion 44 includes four raised longitudinal ribs 54 that project radially from the cylindrical surface 52. The longitudinal ribs 54 are elongated plateaus that are evenly spaced apart along the circumference of the cylindrical surface 52. An engagement surface 68 of the longitudinal ribs 54 defines a diameter that is slightly larger than the diameter of the cylindrical surface 52. It should be noted that surface 52 shares the same central axis as the grooves 48. Each of the longitudinal ribs 54 include drafted sides 56 that are formed at an angle other than perpendicular to the cylindrical surface 52. The sides 56 of the longitudinal ribs 54 are drafted for ease of molding and to provide a cam surface for disconnecting the assembly 10.

As shown in FIG. 3, the longitudinal ribs 54 extend along the length of the fastener portion 44 from the base 46 beyond the grooves 48 at the distal end 58. The cylindrical shank 50 includes a lead-in surface 64 adjacent the distal end 58. The lead-in surface 64 is tapered from the cylindrical surface 52 toward the distal end 58. The lead-in surface 64 provides a method of engaging and aligning the mating part with the fastener disc 12. The cylindrical surface 52 shares the same central axis as the grooves 48 and four longitudinal ribs 54. The longitudinal rib 54 may also include a lead-in surface adjacent the distal end 58.

The mating part 40 also includes an anti-rotation feature 66. The anti-rotation feature 66 is formed as a wedge connected between the fastener portion 44 and the base 46. The anti-rotation feature 66 engages a corresponding groove formed on the panel 80 to which the mating part 40 is attached to prevent the mating part 40 from rotating during use and while the disc 12 is be connected and disconnected. Other anti-rotation or keying methods which prevent rotation of the mating part 40 are also possible. FIG. 5 is an end view of the mating part 40 further showing the anti-rotation feature 66 provided for the single point mount hook example.

Figure 6:
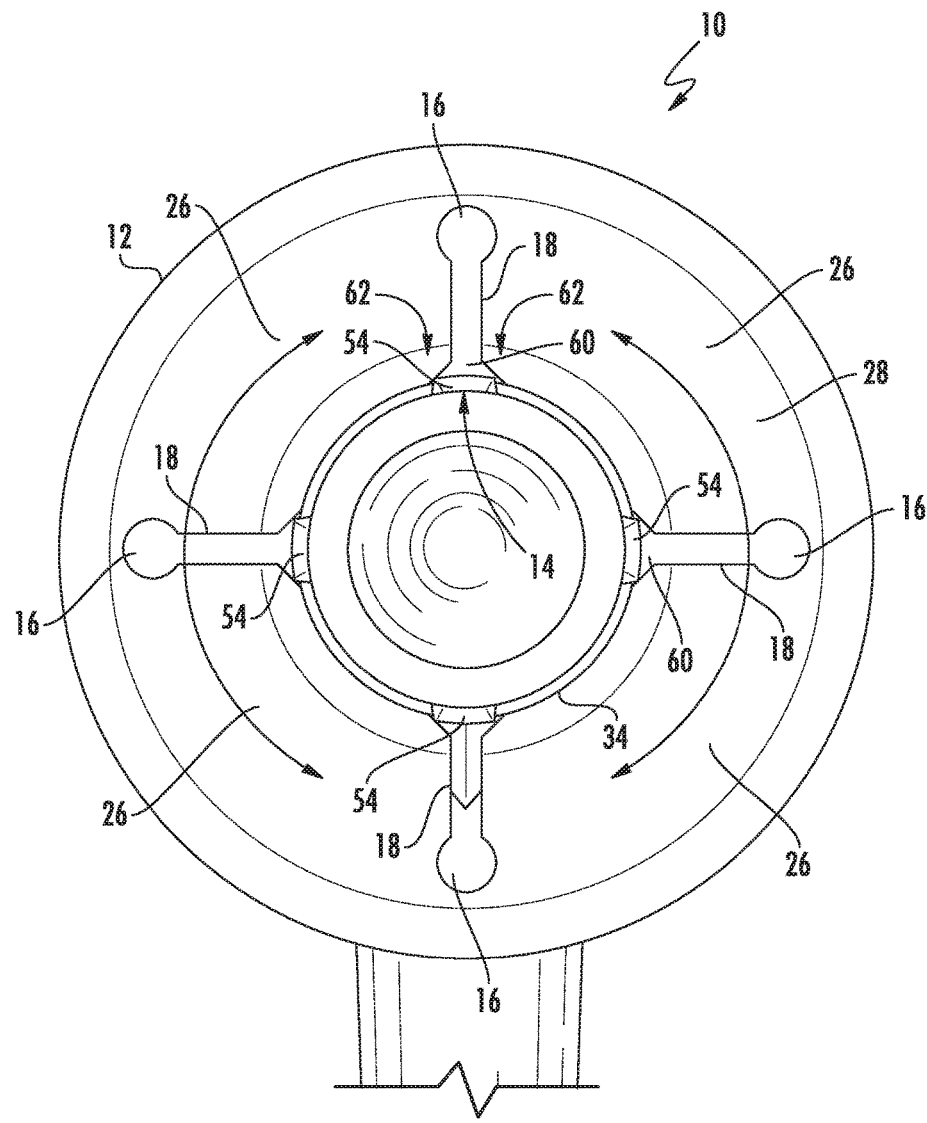
FIG. 6 is a rear view of the eighth-turn assembly of FIG. 1 in a locked position.
Figure 7:
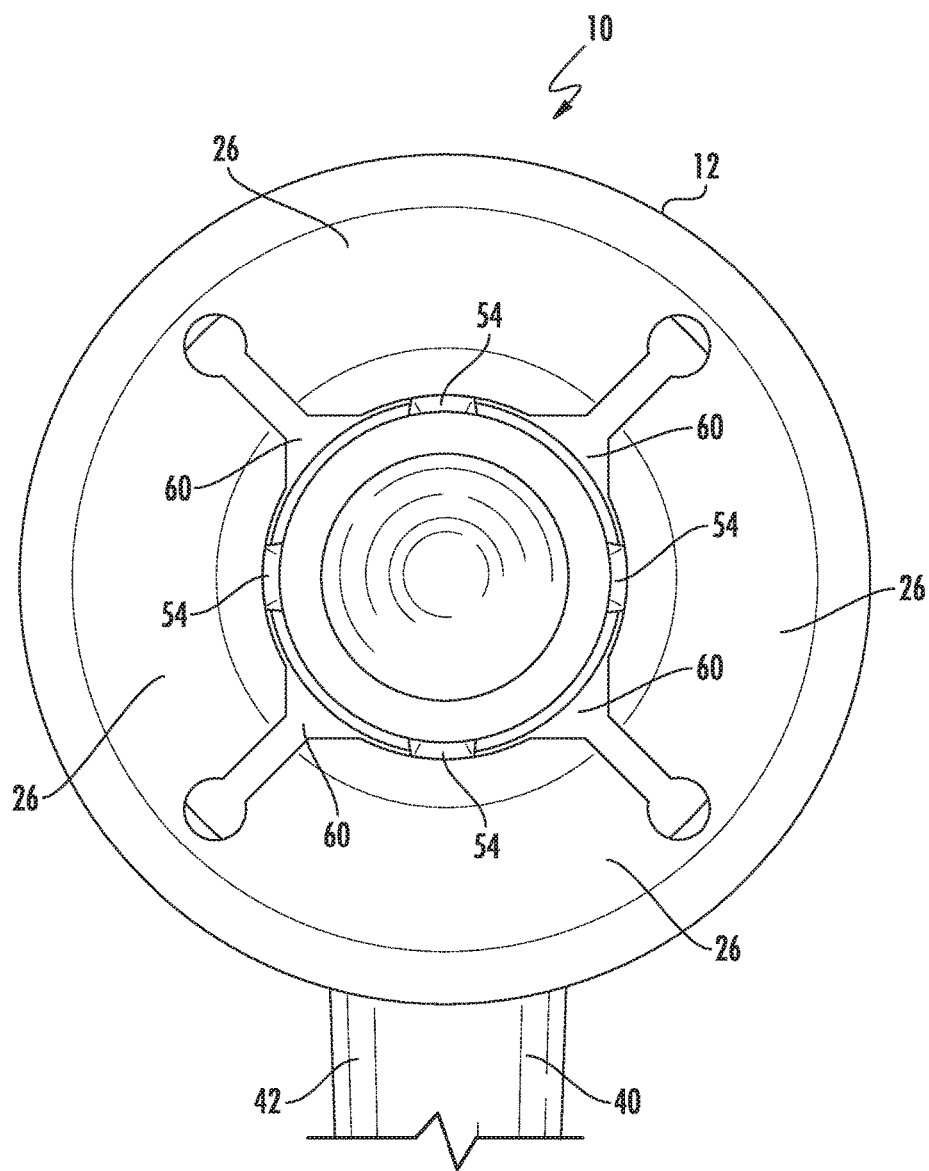
FIG. 7 is a rear view of the eighth-turn assembly of FIG. 1 in release position.

As illustrated in FIGS. 6-7, the disc 12 includes a chamfered opening 60 where the slot 18 connects to the central opening 20. The chamfered opening 60 is defined by chamfered walls 62 that are oriented at an angle from the walls defining the slot 18 so that the chamfered opening 60 is wider than the slot 18. The chamfered walls 62 are oriented as mirror images about a central axis of the slot 18. The chamfered opening 60 extend radially from the central opening 20.

FIG. 6 illustrates the rear view of the quick-disconnect fastening assembly 10 where the mating part 40 and the fastener disc 12 are in the fully engaged and locked position.

In the locked position, one of the chamfered openings 60 is aligned with one of the longitudinal ribs 54. It should be noted that chamfered opening 60 freely clears the four longitudinal ribs 54. Further, as shown in FIG. 6, the angle of the chamfered walls 62 is a generally equal to the angle of the drafted side surfaces 56.

Figure 8:
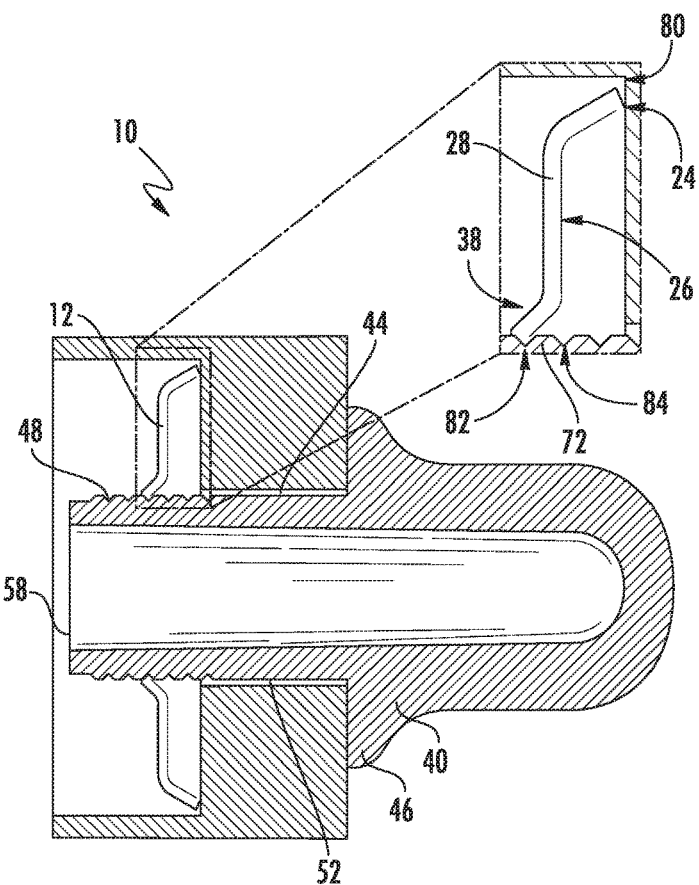
FIG. 8 is a detailed section view of a portion of the quick-disconnect fastening assembly in the locked position.

FIG. 8 is a sectional view of the quick-disconnect fastening assembly 10 when the disc 12 is in the fully engaged position with the fastener portion 44 of the mating part 40. During installation, the longitudinal ribs 54 are aligned with the chamfered openings 60 and the cylindrical shank 50 of the mating part 40 is inserted into central opening 20. Since the diameter D2 of cylindrical surface 52 has a diameter that is greater than the diameter D1 of the central opening 20, the flexible tabs 26 expand outward away from the forward surface 28 during engagement. As the flexible tabs 26 expand and deflect, the inner edge 34 clears the first circumference rib 72 and then snaps into first groove 48. With continued force applied to the disc 12, the flexible tabs 26 continue to expand and deflect to be moved past each of the circumference ribs 72 and then snap into place in each of the grooves 48. This process continues until the peripheral base 24 is positioned adjacent to or abutting the panel surface 80.

In the engaged position shown in FIG. 8, the disc 12 is retained on the fastening portion 44 with an interference fit, or sometimes referred to as a friction fit, or snap fit. In the engaged position the inner edge 34 resides in the groove 82. The inner edge 34 of each tab 26 is formed at an angle and engages a wall of the groove closet to the distal end 58 so that any backward motion of the disc 12 will cause the inner edge 24 of the tab 26 to jam against the surface of the groove, thereby preventing any further backward motion and preventing the disc 12 from being removed from the fastener portion 44. The spacing between the grooves 48 and the thickness of the disc 12 is designed such that the yield of the material used to manufacture the disc 12 is never exceeded regardless of position or number of exposed grooves when assembled.

By pushing the disc 12 still further, the inner edge 34 of the flexible tabs 26 will rise up from the first groove 82 and drop into the second groove 84 and thus complete the assembly process with maximum retention. During insertion or assembly, the inner edge 34 of each tab 26 will make an audible sound as the tabs 26 are snap-fit into each of the grooves 48 in rapid succession.

The disc 12 is then easily removable from the fastening portion 44 in two motions; first turning the disc and then pulling the disc 12 or mating part 40. By rotating the fastener disc 12 while the mating part 40 remains stationary, the chamfered walls 62 will make contact with drafted side surfaces 56. Continuing to turn the fastener disc 12 another 45-degrees, or approximately an eighth-turn, will cause the inner edge 34 to climb out of the grooves 48 until the inner edge 34 resides on top of the engagement surface 68 of the four longitudinal ribs 54, as detailed in FIG. 7. In the release position in FIG. 7, the longitudinal ribs 54 deflect the inner edge 34 of each of the tabs 26 so that the diameter of the inner opening 20 is greater than the diameter of the cylindrical shank 50. Once the fastener disc 12 is in the release position in FIG. 7, the mating part 40 can be easily removed from the panel by pulling the mating part 40 or disc 12 to remove the disc 12 from the fastener portion. Removing the mating part 40 and allows easy replacement, if so needed.

Figure 9:
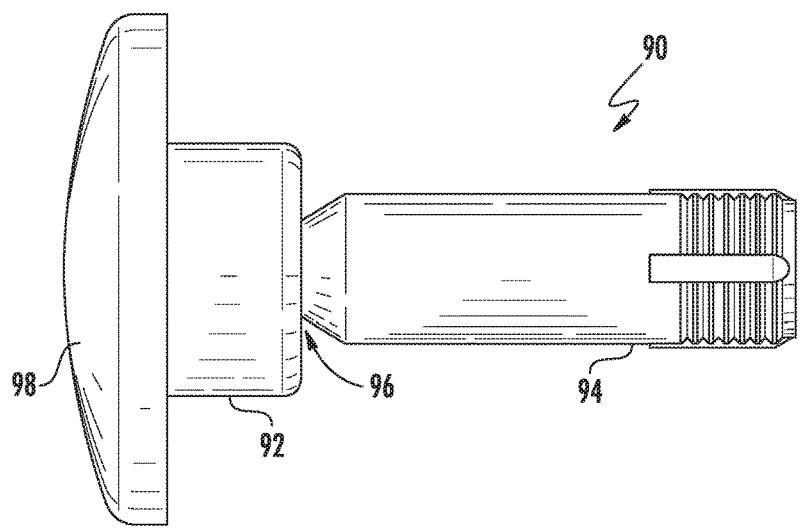
FIG. 9 illustrates a mating part of the quick-disconnect fastening assembly, according to one embodiment.

FIG. 9 illustrates another use of the quick-disconnect fastener assembly 10. FIG. 9 illustrates a mating part 90 having a releasable hardware portion 92. For example, when hook-and-rail assemblies are installed by the consumer to a panel, it is desirable to conceal the fastener and fastener holes used to attach the rail to the panel. This is typically accomplished by use of either wood or plastic dome plugs. Also, hook-and-rail assemblies are in some cases sold at retail installed onto cards for purposes of display and typically include marketing materials and instructions on the card. The packaging fasteners used to attach the hook-and-rail assembly to the display card are typically either in the form of a plastic rivet, which can be difficult to remove by the consumer or a plastic wing-nut and bolt combination. The mating part 90 includes a dome plug design which also provides a means of attaching a hook rail to a retail display card.

The hardware portion 92 defines a dome plug 98. The fastening portion 44 enables the attachment of the hook-and-rail assembly to a display card. Such an approach more accurately shows the buying consumer what the product will look like, once installed. The mating part 90 includes a reduced thickness area 96 between the hardware portion 92 and the fastening portion 94. The reduced thickness area 96 is frangible to allow the dome plug 98 to be separated from the fastening portion 44. For example, the hardware portion 92 can be separated by twisting or bending along the reduced thickness area 96 until the hardware portion 92 separates from the fastener portion. The mating part 90 may be formed of polymer material manufactured by injection molding in a color which substantially matches the color of the hook rail.

Figure 10:
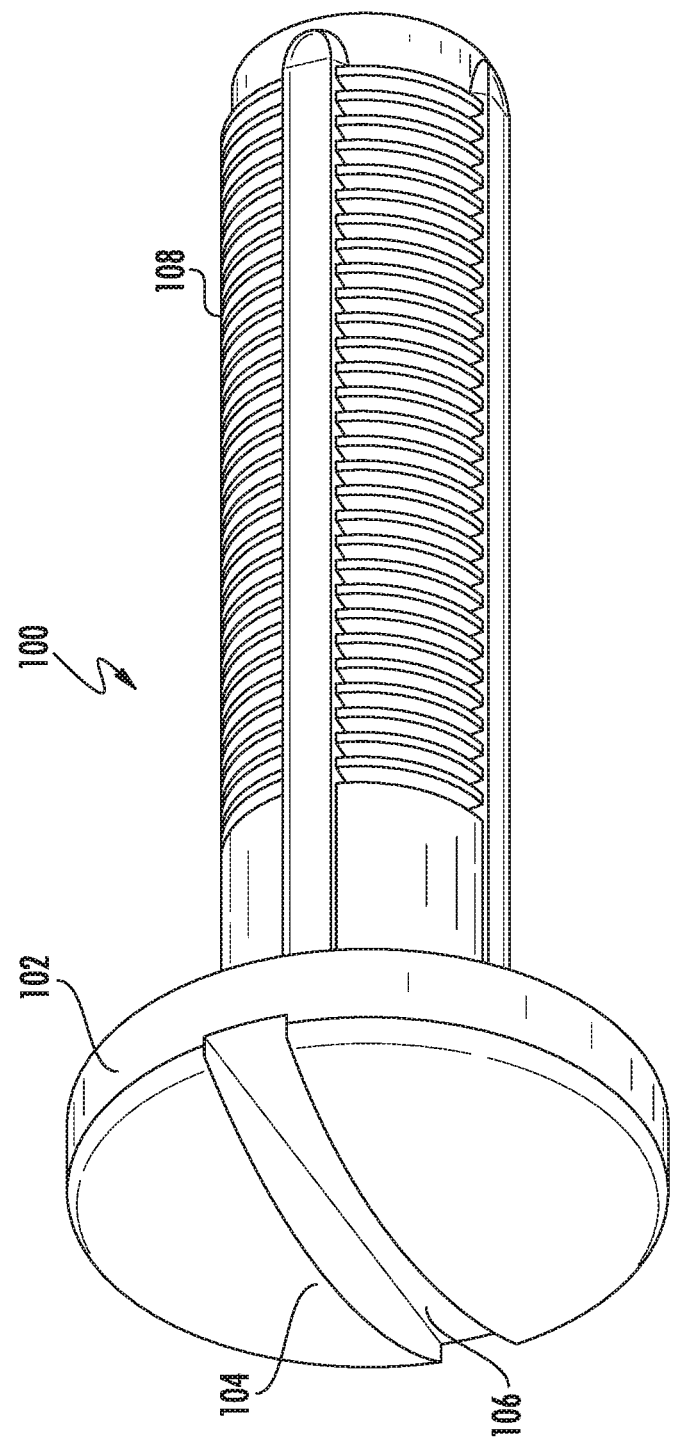
FIG. 10 illustrates a mating part of the quick-disconnect fastening assembly, according to one embodiment.

FIG. 10 illustrates another use of the quick-disconnect fastener assembly 10. FIG. 10 illustrates a mating part 100 having a hardware portion 102 formed as a fastener head with a standard slot drive configuration in a common round or pan head 104, as shown. In addition to the slotted drive configuration 106, the hardware portion 102 may include any number of standard drive configurations including cross-recessed, square recessed, hex, torx, for example. The head 104 is connected to a fastening portion 44 containing features as shown and described above.

Figure 11:
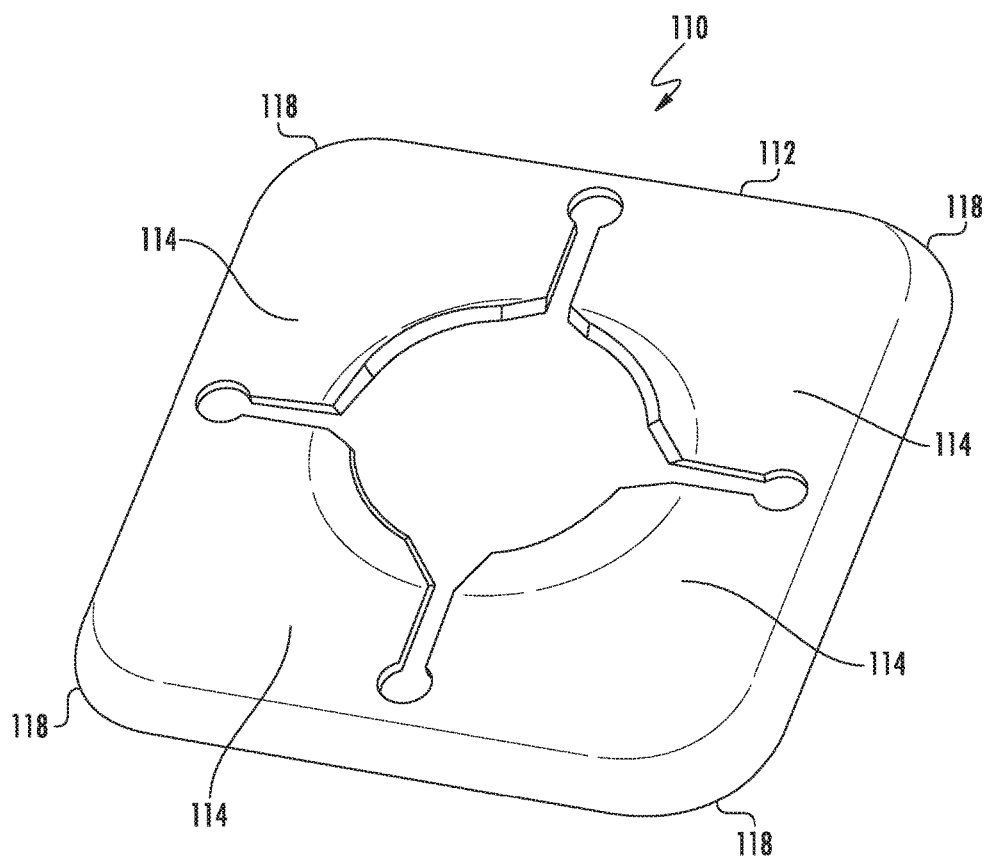
FIG. 11 illustrates a fastener disc of the quick-disconnect fastening assembly, according to one embodiment.

FIG. 11 illustrates a disc 110 having a square peripheral edge 112. The square peripheral edge 112 provides increased rigidity to the flexible tabs 114. Further, the square disc 110 allows conventional tools to more easily hold and clamp the square peripheral edge 112 in order to turn the disc to disconnect the assembly. If additional rigidity is needed, the flexible tabs 114 may include embossment ribs toward the corners 118, for example.

Figure 12:
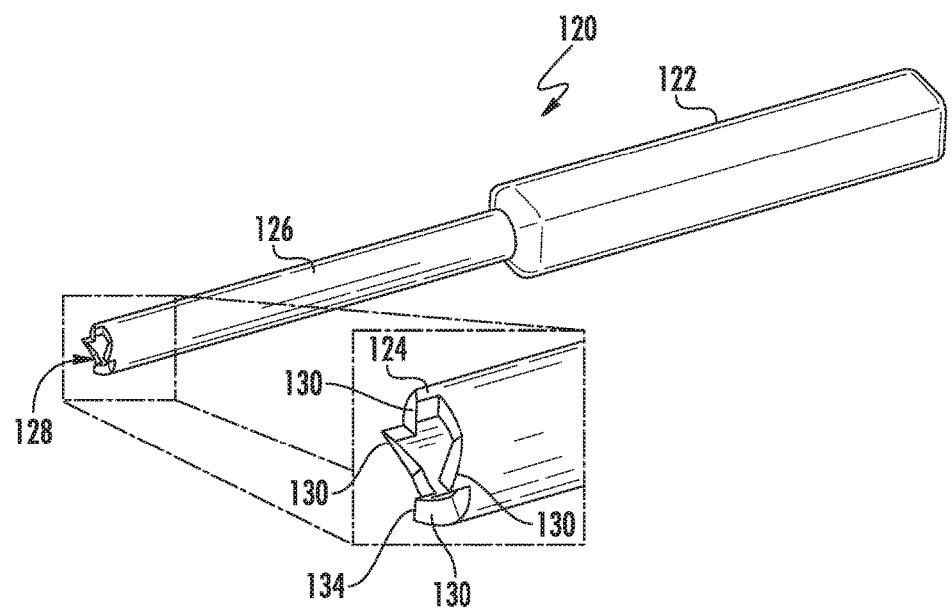
FIG. 12 illustrates a tool for use with the quick-disconnect fastening assembly, according to one embodiment.
Figure 13:
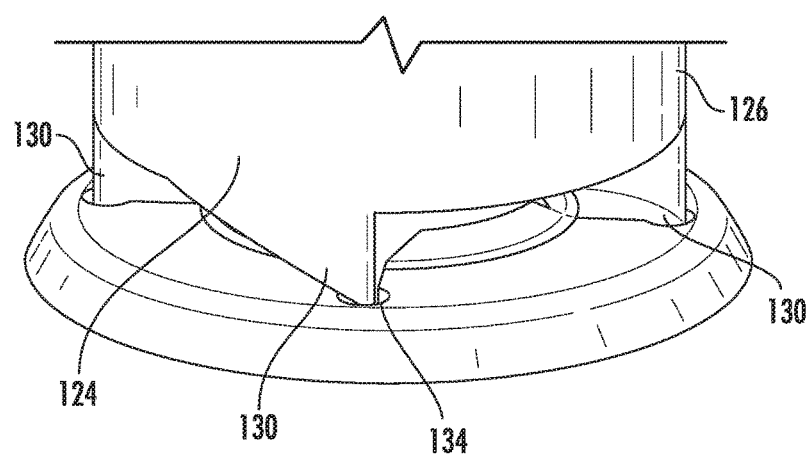
FIG. 13 illustrates the tool of FIG. 12 in use with the quick-disconnect fastening assembly.

FIG. 12 illustrates an installation and removal tool 120 for use with the quick-disconnect fastening assembly 10 for removing the fastener disc 12 from the mating part 40. The tool 120 may include a hollow square handle 122 for gripping the tool 120. However any shaped handle 122 may be utilized. Extending from the handle 122 is an engagement portion 124. The engagement portion 124 is formed of a hollow round tube 126. The distal end 128 of the tube 126 contains four engagement teeth 130. The four engagement teeth are spaced apart evenly around a circumference of the hollow tube 126. Each of teeth 130 has an engagement surface 134 that are oriented radially and perpendicular to the circumference of the hollow tube 126. The engagement surfaces are inserted into the four through slots 18, as shown in FIG. 13. When the teeth 130 are inserted in the slots 18, the tool 120 is rotated to the removal position, as shown in FIG. 7. The tool 120 may also be used to install the disc 12 to ensure the disc is fully seated on onto its mating component.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fastener assembly comprising:
   a cylindrical shank with a plurality of annular grooves formed along a length of the shank;
   a plurality of elongated ribs that extend perpendicular to the grooves along the length; and
   a fastener disc with a central opening with a diameter less than a cylindrical shank diameter wherein an inner edge of the central opening includes a contact surface;
   wherein the fastener disc is retained on the cylindrical shank in a locked position when the contact surface engages one of the plurality of grooves with a friction fit; and
   wherein the fastener disc is rotated to a release position so that the elongated rib contacts the inner edge thereby releasing the contact surface from the grooves.

2. The fastener assembly of claim 1 wherein the elongated ribs have drafted sides that act as a cam surface when the disc is rotated.

3. The fastener assembly of claim 1 wherein in the release position, the rib causes the contact surface to deflect so that the diameter of the central opening is greater than the cylindrical shank.

4. The fastener assembly of claim 1 further comprising a plurality of deflectable tabs connected to the fastener disc, wherein the contact surface comprises an inner edge of each deflectable tab is defined along the central opening of the fastener disc.

5. The fastener assembly of claim 4 wherein the fastening disc includes a plurality of slots that project radially outward from the central opening, one of the deflectable tabs is formed between each of the slots.

6. The fastener assembly of claim 4 wherein the plurality of tabs comprises four deflectable tabs, wherein the fastener disc is turned generally an eighth-turn to the release position.

7. The fastener assembly of claim 1 further comprising a radial opening extending from the central opening and defined between each of the tabs, wherein the elongated rib is aligned with the radial opening with the disc is in the locked position.

8. The fastener assembly of claim 1 further comprising a disassembly tool, to engage and rotate the disc to the release position.

9. The fastener assembly of claim 8 wherein the disassembly tool comprises a plurality of teeth, wherein each tooth is shaped to engage a slot between each deflectable tab.

10. The fastener assembly of claim 8 wherein the disassembly tool grips a peripheral edge of the disc.

11. The fastener assembly of claim 1 wherein the grooves are defined between the elongated ribs.

12. A quick-disconnect fastener assembly comprising:
    a mating part with a hardware portion and a fastener portion, the fastener portion comprising:
    a cylindrical shank with a plurality of annular grooves formed along a length of the shank, and
    a plurality of elongated plateaus that extend the length of the cylindrical shank perpendicular to the grooves, wherein the elongated plateaus have drafted sides;
    a fastener disc with a central opening with a diameter less than a cylindrical shank diameter, a plurality of slots that project radially outward from the central opening, and a chamfered opening between each of the slots and the central opening, wherein a chamfer angle of the chamfered opening is generally equal to a draft angle of the drafted sides along the plateaus; and a plurality of deflectable tabs, each tab defined between two adjacent slots, wherein an inner edge of each deflectable tab is defined along the central opening;

wherein the fastener disc is retained on the mating part when the cylindrical shank is inserted through the central opening so that each of the elongated plateaus is aligned with one of the chamfered openings and the plurality of deflectable tabs is engaged with one of the plurality of grooves with a snap-fit, and wherein the fastener disc is disconnected from the mating part by rotation of the disc whereby the elongated plateaus contact the inner edge of the deflectable tabs and release the deflectable tabs from the grooves so that the cylindrical shank is removable from the central opening.

13. The quick-disconnect fastener assembly of claim 12 wherein the hardware portion of the mating part comprises a hook.

14. The quick-disconnect fastener assembly of claim 12 wherein the hardware portion of the mating part comprises a fastener head.

15. The quick-disconnect fastener assembly of claim 12 wherein the mating part comprises a frangible connection for disconnecting the hardware portion.

* * * * *